United States Patent [19]

Tubman

[11] Patent Number: 4,679,424
[45] Date of Patent: Jul. 14, 1987

[54] PRESSURE TESTER CAP

[76] Inventor: Iosif Tubman, 1480 E. 17th St., Brooklyn, N.Y. 11230

[21] Appl. No.: 906,280

[22] Filed: Sep. 8, 1986

[51] Int. Cl.⁴ ............................................. G01M 3/32
[52] U.S. Cl. ..................................... 73/45.8; 73/49.7; 220/DIG. 32
[58] Field of Search ........................ 73/45.8, 40, 49.7; 220/DIG. 32

[56] References Cited

U.S. PATENT DOCUMENTS

| | | | |
|---|---|---|---|
| 1,782,496 | 11/1930 | Anchelevich | 220/DIG. 32 |
| 2,225,964 | 12/1940 | Bailey | 73/45.8 X |
| 3,034,521 | 5/1962 | Greenfield | 220/DIG. 32 |
| 3,213,672 | 10/1965 | Orr | 73/45.8 |
| 4,235,100 | 11/1980 | Banchini | 73/49.7 |
| 4,342,220 | 8/1982 | Catchpole et al. | 73/49.7 |
| 4,494,402 | 1/1985 | Carney | 73/49.7 X |

Primary Examiner—Stewart J. Levy
Assistant Examiner—Joseph W. Roskos
Attorney, Agent, or Firm—Richard L. Miller

[57] ABSTRACT

A pressure tester cap is provided and consists of an air valve sleeve which further houses a conventional SCHRADER ® type air valve, and is incorporated within a pressurized radiator cap which when mounted on a neck of a radiator of a motor vehicle, permits the cooling system to be charged with compressed air from an external source, so as to ascertain if there are any leaks in the radiator system.

4 Claims, 3 Drawing Figures

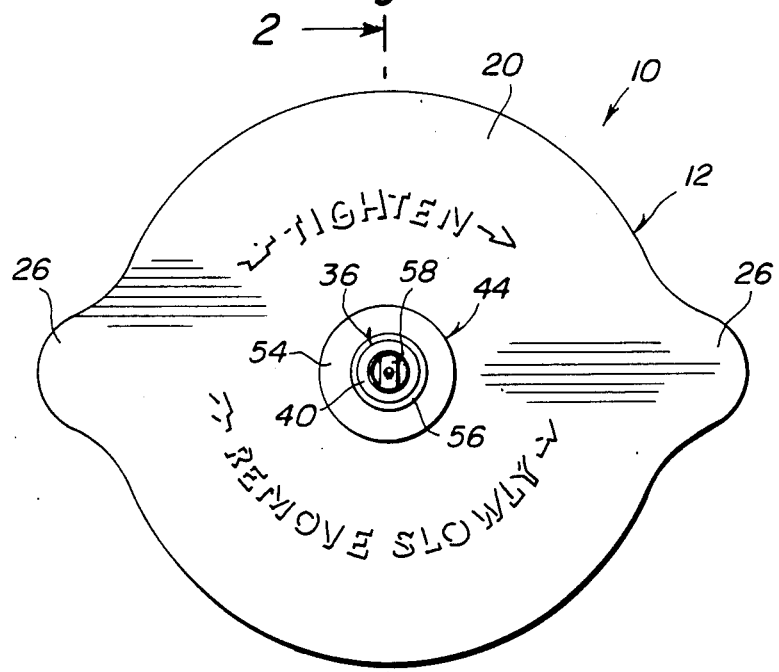
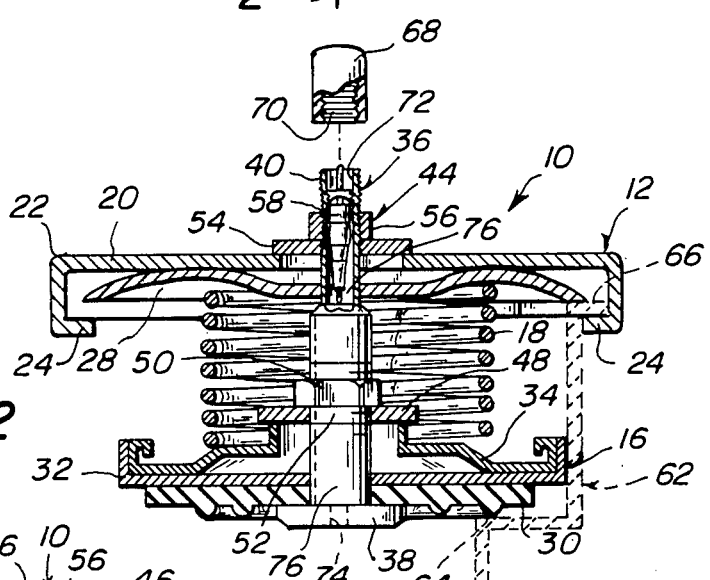
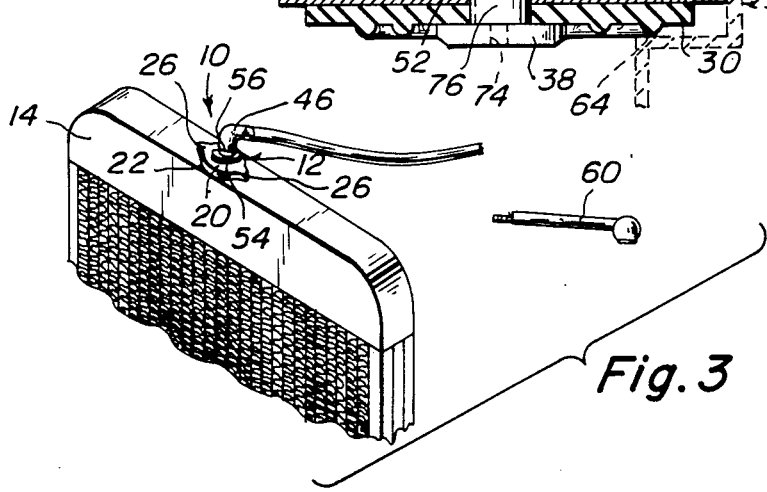

PRESSURE TESTER CAP

BACKGROUND OF THE INVENTION

The instant invention relates generally to motor vehicle radiator caps and more specifically it relates to a pressure tester cap.

Numerous motor vehicle radiator caps have been provided in prior art that are adapted to include pressure release mechanisms built within. For example, U.S. Pat. Nos. 3,112,840; 3,587,912 and 4,056,120 all are illustrative of such prior art. While these units may be suitable for the particular purpose to which they address, they would not be as suitable for the purposes of the present invention as heretofore described.

SUMMARY OF THE INVENTION

A primary object of the present invention is to provide a pressure tester cap that will overcome the shortcomings of the prior art devices.

Another object is to provide a pressure tester cap that combines an air valve stem with a pressurized radiator cap so that compressed air can be inserted within a radiator of a motor vehicle to check for leaks in the radiator.

An additional object is to provide a pressure tester cap that will allow the testing for leaks in a radiator before removing the radiator from a motor vehicle.

A further object is to provide a pressure tester cap that is simple and easy to use.

A still further object is to provide a pressure tester cap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a top view of the invention.

FIG. 2 is a cross sectional view taken on line 2—2 of FIG. 1, illustrating the construction in greater detail.

FIG. 3 is a perspective view of the invention mounted on a motor vehicle radiator to check for leaks therein.

DETAILED DESCRIPTION OF THE PREFERRED EMBODIMENTS

Turning now descriptively to the drawings, in which similar reference characters denote similar elements throughout the several views, FIGS. 1 through 3 illustrates a pressure tester cap 10 of the type that has a cover assembly 12 removably mounted on a neck assembly 62 (and shown partially in dot) of a radiator 14 of a motor vehicle, a valve assembly 16 of a smaller diameter, of the cover assembly 12 to fit within the neck assembly 62 and a helical coil spring 18 interposed between the cover assembly 16 urging the valve assembly away from the cover assembly and toward the valve seat 64 which is actually a circular flange surface on the neck 62 of the radiator 14.

The cover assembly 12 is conventional and includes a cap 20 that has a peripheral down turned flange 22 from which tangs 24 extend from. The cap 20 is circular except for two oppositely disposed ears 26 facilitating manual tightening and removal with respect to the neck. A leaf spring 28 bears against the top edge 66 of the neck assembly 62 and coacts with helical coil spring 18 in order to hold it concentrically with the rest of the components. The value assembly 16 is conventional and includes a rubber washer 30, an outturned flange 32, and a lower guide member 34 which contacts bottom of the helical coil spring 18 and also help to hold this spring 18 in concentric alignment with the rest of the components.

The invention consists of an air valve sleeve 36 that has one end 38 supporting the valve assembly 16 and has its other end 40 extending through the cover assembly 12. A first fastener nut 50 is for holding the valve assembly 16 on the air valve sleeve 36. A fastener unit 44 is for securing the air valve sleeve 36 in the cover assembly 12. Air under pressure can be discharged into the radiator 14 from an air hose chuck 46 to check the radiator for leaks and still permit water and steam to escape from the radiator when pressure in the radiator 14 rises above a predetermined level.

Below the nut 50 is washer 48 to fit over the air valve sleeve 36 and onto top of the valve assembly 16. Nut 42 threadably engages lower portion 52 of the air valve sleeve 36 to make contact with the lower washer 48 for holding the valve assembly 16 in place.

The fastener unit 44 consists of an upper washer 54 to fit over the air valve sleeve 36 and onto top of the cover assembly 12. A round nut 56 threadably engages upper externally threaded portion 40 of the air valve sleeve 36 to make contact with the upper washer 54 for securing the air valve sleeve 36 in place. The air valve sleeve is internally threaded 72, and further houses a conventional SCHRADER ® type air valve 58 threadable within the air valve sleeve for permitting the entry of air through passage way 76 and out of orifice 74 in to the radiator, and then holding pressurized air within the radiator 14 which can be checked by a conventional air gauge 60 similar to those generally used to check tire pressure etc.

The same externally threaded portion 40 may be fitted with a protective cap 68 which is internally threaded 70 and serves two additional purposes; that is of keeping the SCHRADER ® type air valve 58 clean; and also preventing any seepage of fluid should the SCHRADER ® type air valve 58 tend to leak by itself.

In operative use it is to be noted that the instant invention permits the pressure of the radiator system in question to be checked while the radiator is connected in the cooling system of an engine and in use, and without the shutting down the engine or removing the radiator cap.

It is to be noted that through out this specification the word air is used in many places because this word is used as a common every day adjective for many parts, however it should be realized that this should not be assumed as a limitation. Fluid would be a better term since in this particular invention because the fluid can be air, water, vapor, steam, anti-freeze, coolant, or various combinations thereof.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A pressure tester cap as of the type having a cover assembly removably mounted on a neck of a radiator of a motor vehicle, a valve assembly of a smaller diameter of said cover assembly and said valve assembly urging said valve assembly away from said cover assembly, the improvement comprising:
   (a) an air valve sleeve having one end supporting said valve assembly and having its other end extending through said cover assembly;
   (b) means for holding said valve assembly on said air valve sleeve, wherein said holding means comprises:
      (i) a lower washer to fit over said air valve stem and onto top of said valve assembly; and
      (ii) a nut which threadably engages lower portion of said air valve sleeve to make contact of with said lower washer for holding said valve assembly in place; and
   (c) means for securing said air valve sleeve on said cover assembly so that air under pressure can be discharged into said radiator from an air hose chuck to check said radiator for leaks and still permit fluid to escape from said radiator when pressure in said radiator rises above a predetermined level.

2. A pressure tester cap as recited in claim 1 wherein said securing means comprises:
   (a) an upper washer to fit over said air valve sleeve and onto top of said cover assembly; and
   (b) a round nut which threadably engages upper portion of said air valve sleeve to make contact with said upper washer for securing said air valve sleeve in place.

3. A pressure tester cap as recited in claim 2 wherein said air valve sleeve further includes an air valve threadable within said air valve sleeve for holding pressurized fluid within said radiator.

4. A pressure tester cap as recited in claim 3 wherein said air valve sleeve further includes means for preventing said fluid from seeping therefrom should said air valve tend to leak.

* * * * *